(12) United States Patent
Evans (10) Patent No.: US 6,738,011 B1
(45) Date of Patent: May 18, 2004

(54) GROUND ELIMINATION TECHNIQUE IN VERTICAL PROFILE RADAR DISPLAYS

(75) Inventor: Joseph B. Evans, Bellevue, WA (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/439,880

(22) Filed: May 16, 2003

(51) Int. Cl.$^7$ .............................................. G01S 13/00
(52) U.S. Cl. ........................ 342/26; 342/89; 342/176; 342/179
(58) Field of Search .................... 342/25–26, 89–93, 342/118, 175–186, 195, 460; 702/1–4

(56) References Cited

U.S. PATENT DOCUMENTS

| | | | |
|---|---|---|---|
| 3,810,175 A | * | 5/1974 | Bell ............................ 342/183 |
| 5,311,183 A | * | 5/1994 | Mathews et al. .............. 342/26 |
| 5,488,375 A | * | 1/1996 | Michie ......................... 342/26 |
| 5,539,409 A | * | 7/1996 | Mathews et al. .............. 342/26 |
| 5,945,926 A | * | 8/1999 | Ammar et al. ............... 340/970 |
| 6,400,312 B1 | * | 6/2002 | de Laval ..................... 342/148 |
| 6,433,729 B1 | * | 8/2002 | Staggs ......................... 342/29 |
| 6,480,142 B1 | * | 11/2002 | Rubin .......................... 342/26 |

* cited by examiner

*Primary Examiner*—Thomas H. Tarcza
*Assistant Examiner*—Brian K Andrea
(74) *Attorney, Agent, or Firm*—Honeywell Int'l Inc.

(57) ABSTRACT

A method and system for suppression of ground returns in a vertical profile radar display. The method includes receiving radar returns each comprising a plurality of range bins collated to a vertical profile radar display. The received range bins are analyzed to locate ground returns. A plurality of range bins are selected based upon the located ground returns. The radar returns are modified based upon the selected range bins.

39 Claims, 6 Drawing Sheets

Theoretical Ground Return Area

GROUND ELIMINATION TECHNIQUE IN VERTICAL PROFILE RADAR DISPLAYS

FIELD OF THE INVENTION

This invention relates generally to radar displays and, more specifically, to vertical profile displays.

BACKGROUND OF THE INVENTION

Analog radars can be configured to generate a vertical profile along any given radial. The operational difference between the standard weather radar and the vertical profile weather radar is the additional ability to scan the antenna up and down, generally about thirty degrees above and below the aircraft horizontal centerline to generate the vertical profile.

The vertical profile feature generates the vertical profile by direct means, i.e. scanning the vertical characteristics of the weather cell. The vertical profile augments the normal azimuth scan aiding the operator in developing a three-dimensioned mental image of the observed weather cell.

Vertical profile radars generally rely upon the skill of the operator interpreting the displayed return to discriminate between ground returns and weather. Ground returns generally appear to the operator or other viewer as a cross-section of a flashlight-like beam across the vertical profile. As the radar beam is scanned over the ground, the solid returns characterized by a mirror image above and below the ground level providing reflectivity equal to the beam width and power level. As the altitude and range increase, the ground returns will decay in much the same way as they increased from where the beam first intersected the ground. The problem is that where weather is present, it is often difficult to distinguish a line between ground and weather returns. One radar manufacturer, Bendix, makes the point in their owners manual for the model RDS 82VP: "The best time to begin using Vertical Profile is on a nice sunny day when the operator work load will allow time to experiment with the new feature . . . If you have completed the above operations on a sunny day as suggested, you have experienced the simple operation of Vertical Profile and observed a very unimpressive display of ground paint . . . The understanding of this very basic presentation is an important key in interpreting low level weather."

The principal problem is that vertical profile radar requires skill and judgment to properly interpret the low level weather. As the operator of an airplane will often have a number of instruments competing for the operator's attention, requiring such skill and judgment in the course of operation of the airplane is not prudent. There exists an unmet need for vertical profile weather radar that suppresses returns from the ground.

SUMMARY OF THE INVENTION

The present invention includes a method and a system for suppressing or coloring the display of ground returns in a vertical profile radar.

In accordance with further aspects of the invention, a processor locates a ground level based either upon a database of vertical terrain elevation data or upon discerning a known characteristic ground return within a collated set of radar returns representing a vertical profile display.

In accordance with other aspects of the invention, once the ground level is located, the processor selectively suppresses or colors returns from radar range bins at the located ground level.

As will be readily appreciated from the foregoing summary, the invention provides a method for suppression of ground returns in a vertical profile radar display. The method includes receiving radar returns each comprising a plurality of range bins collated to a vertical profile radar display. The received range bins are analyzed to locate ground returns. A plurality of range bins are selected based upon the located ground returns. The radar returns are modified based upon the selected range bins.

DETAILED DESCRIPTION OF THE PREFERRED EMBODIMENT

The preferred and alternative embodiments of the present invention are described in detail below with reference to the following drawings. By way of overview, the invention provides a method for suppression of ground returns in a vertical profile radar display. The method includes receiving radar returns each comprising a plurality of range bins collated to a vertical profile radar display. The received range bins are analyzed to locate ground returns. A plurality of range bins are selected based upon the located ground returns. The radar returns are modified based upon the selected range bins.

Figure 1:
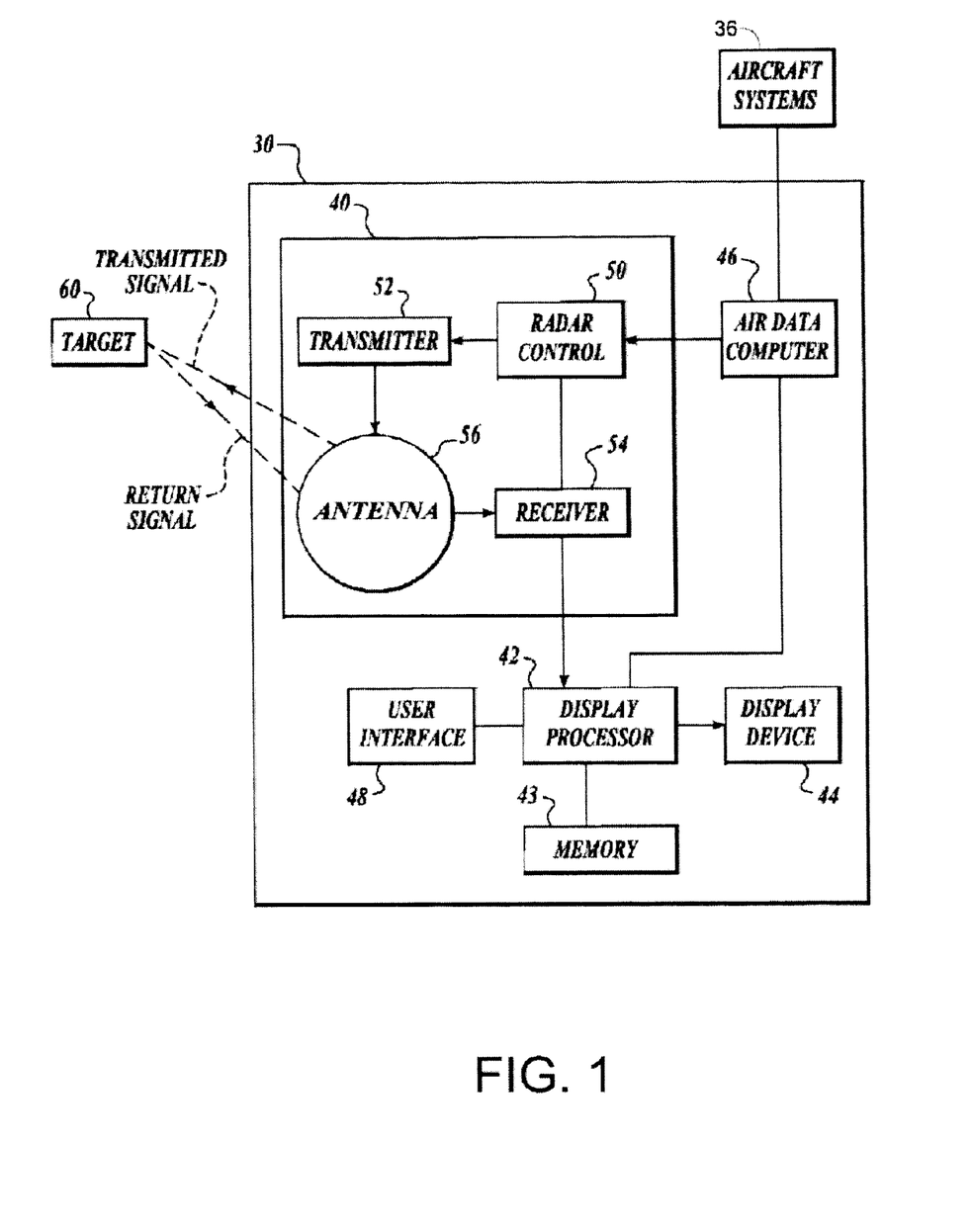
FIG. 1 is a block diagram of a preferred embodiment of the display.

FIG. 1 is a block diagram of a preferred embodiment of the display. Referring to FIG. 1, a display processor system 30 is portrayed. The display processor system 30 receives flight and positional information from at least one input, aircraft instrumentation systems 36. This flight and positional information is received at an air data computer 46. The air data computer 46 compiles the flight and positional information into data readable by a radar control 50 and by a display processor 42 and transmits the data to each respectively.

A radar ranging process generates return information. A radar ranging system 40 includes at least four elements: a transmitter 52, an antenna 56, a receiver 54, and the radar control 50. The transmitter 52 suitably energizes the antenna 56. The energized antenna 56 sends a radio pulse downrange to strike a target 60. The target 60 reflects a portion of the sent radio pulse back to the antenna 56. The reflected radio pulse now energizes the antenna 56. The radar receiver 54, detects the energizing of the antenna 56, measures the time between the energizing of the antenna 56 by the transmitter 52 and the energizing of the antenna 56 due to the reflected radio pulse, and presents that timing information as return information. The radar receiver 54 will break a maximum timing interval into a series of subintervals. These subintervals define range bins such that when a reflected radio pulse energizes the antenna 56 within one or several of the range bins, the range bins corresponding to each radio pulse characterize the return information. Thus, the length the subinterval of time of each range bin defines the precision of the radar.

The radar control 50 augments return information including range bins received from the radar receiver 54 with the flight and positional data received from the air data computer 46 and precise angular aiming information from a radar mount (not pictured) aiming the antenna 56 to give heading, azimuth, and declination information. As a result, each range bin corresponds to a knowable location in proximity to the aircraft.

A display processor 42 receives the augmented data from the receiver. The display processor 42 compiles information necessary to generate a vertical profile display. While the display processor 42 compiles much of the display of the augmented data according to configured instructions to present information to an operator, a user interface 48 allows the operator to selectably instruct the display processor 42 to compile the information according to the operator preference.

To achieve the appropriate compilation at the display processor 42, the display processor 42 compiles the augmented data including range bins in a memory 43 according to its known location. Because the augmented data is sufficient to project the known locations of each range bin in proximity to the aircraft into the memory 43, the display processor 42 further compiles the data to analyze a group of range bins to discern patterns characteristic of terrain returns. Those range bins that make up the pattern are deemed by the processor 42 to be the result of radio pulses reflected from a target 60 that is likely terrain. Where there exists terrain data for the location of each bin, the display processor 42 can certainly determine such of the range bins that are the result of radio pulses reflected from a target 60 that is known terrain.

Based upon the configured and selected instructions, the display processor 42 modifies the data for display on a display device 44. Such modifications might include the suppression of all range bins determined to be radio pulses reflected from a target 60 that is terrain. By one presently preferred alternative, the same range bins, rather, are colored for display in a color that contrasts with that used to display returns from a target 60 suspected to be weather. By another presently preferred alternative, a single line is generated to represent the highest elevation of the range bins that are the result of radio pulses reflected from a target 60 that is terrain, suppressing all returns from range bins from a single radio pulse that are more distant from the antenna 56.

Figure 2:
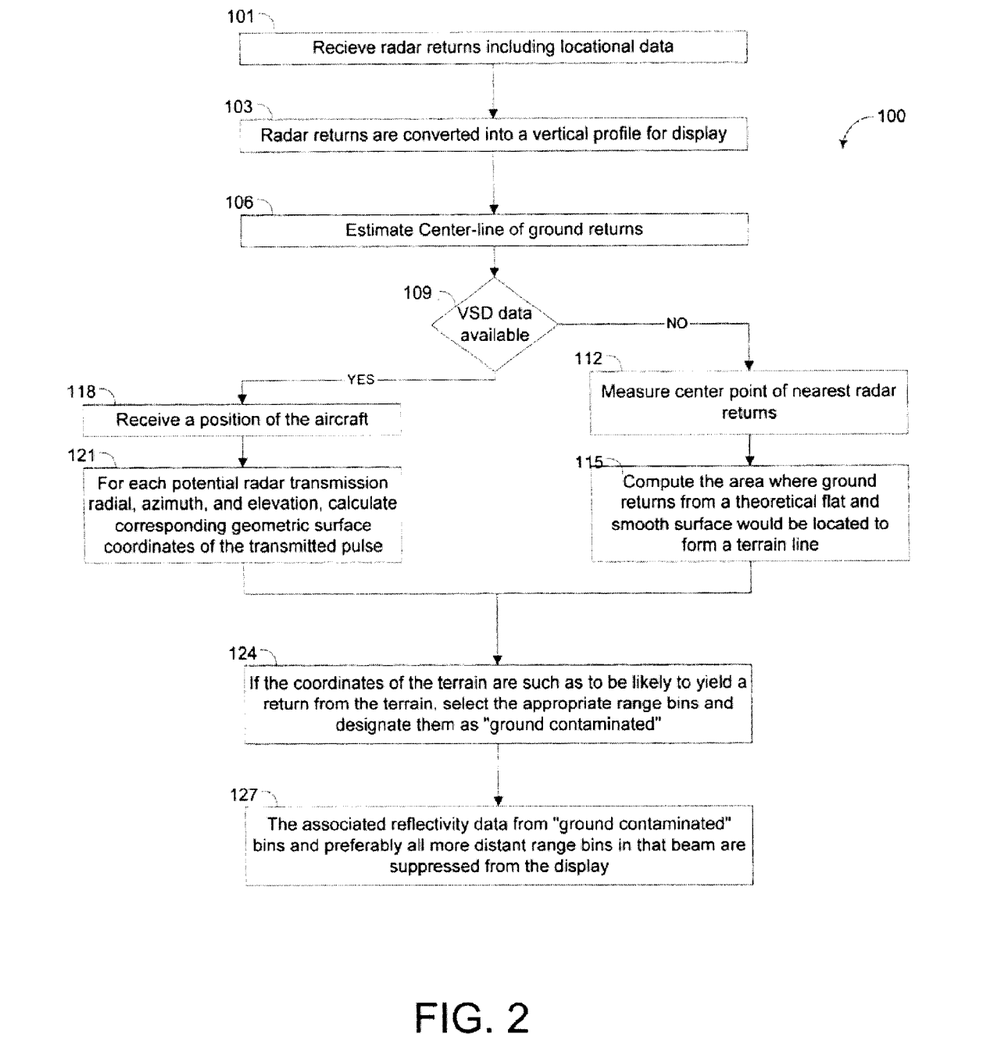
FIG. 2 is a flow chart detailing a method for eliminating ground returns from a display.

FIG. 2 is a flow chart detailing a method 100 for eliminating ground returns from a display. Referring to FIGS. 1 and 2, the method 100 includes receiving radar returns including locational data at a block 101. ARINC 429 is an industry standard data format that is used on most commercial aircraft. The standard defines augmenting radar return data over a local area network for transfer between aircraft instrumentation system elements. At a block 103, the augmented return data are compiled to constitute a vertical profile display. In many weather radars a preferred method for compiling of return data may be performed, in part, by directing the antenna 56 to scan vertically along a suitable heading. Other suitable means, include selectively choosing such returns as are reflected from targets 60 along a given bearing from the aircraft at a defined moment.

At a block 106, a center-line of returns from the ground is estimated. Where there are no other targets 60 in the field of view, ground returns generally present a trapezoidal area with its axis of symmetry aligned with a ground level. Because of its horizontal orientation and generally axial configuration, this characteristic return has been referred to as a "cigar-shaped return pattern." The base of the trapezoid is at the furthest point from the position of the aircraft mounted antenna 56. The axis of symmetry is deemed to be the center-line of ground returns. On a vertical profile display, the convention is to place the aircraft on the left side of the display and furthest displayed range of the radar returns, or the base of the trapezoid, on the right side. While this discussion and the accompanying figures adopts this convention, those skilled in the art will readily perceive that this convention is not limiting.

At a decision block 109, the method for estimating a center-line of ground returns is dependent upon the presence or absence of terrain data. Terrain data also known as vertical Scan Data ("VSD"), is a data set of elevations of located terrain stored in a database (not shown). Such data is, in one presently preferred embodiment, available from a database in an enhanced ground proximity warning system (EGPWS). Where such data is available, at a block 118, position and heading of the aircraft information is received from the aircraft systems 36. At a block 121, the position and heading of the aircraft fix the location of the terrain retrieved as represent terrain along the selected bearing. By calculation, the display processor 42 (FIG. 1), can calculate the intersection of range bin with terrain. Each range bin is then located with respect to the retrieved data describing the terrain.

In the absence of suitable terrain data, at a block 112, presently preferred method of estimating a centerline of a trapezoid that encloses the ground returns is to aim the antenna 56 at an angle approaching vertical and to use the radar ranging system 40 as a radio altimeter. Where using the radar ranging system 40 as a radio altimeter is not practical, there exist algorithms to precisely fix the centerline along the axis of the trapezoid present in the ground returns. At a block 115, one such algorithm locates the trapezoid representing a ground return profile. Having located the trapezoid, the centerline is readily fixed. The location of the ground is then extended forward as a "smooth terrain" line along the axis of the found trapezoid.

At a block 124, the located terrain line is used to determine such range bins that exist more proximal to the aircraft than terrain line. Those range bins including the terrain line and those more distant are deemed "ground contaminated." At a block 127, the "ground contaminated" range bins are suppressed from display data. In another presently preferred embodiment, the "ground contaminated" range bins are suitably modified in the information sent to the display device 44.

Figure 3A:
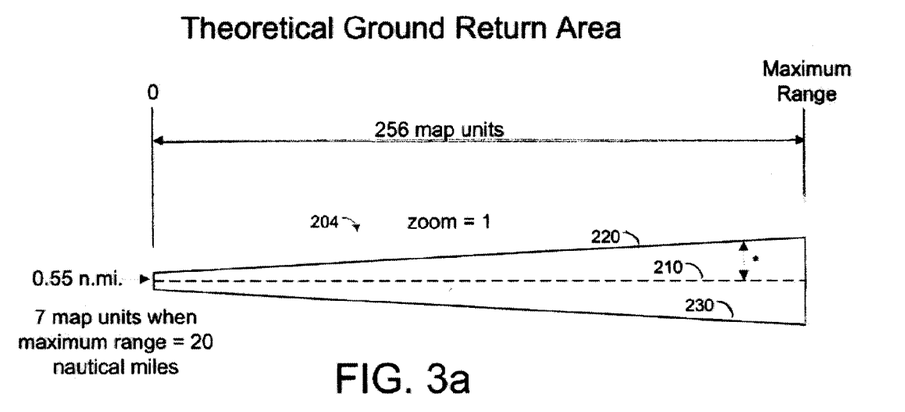
FIG. 3a is a vertical profile of a theoretical ground return as portrayed at a zoom factor of 1.
Figure 3B:
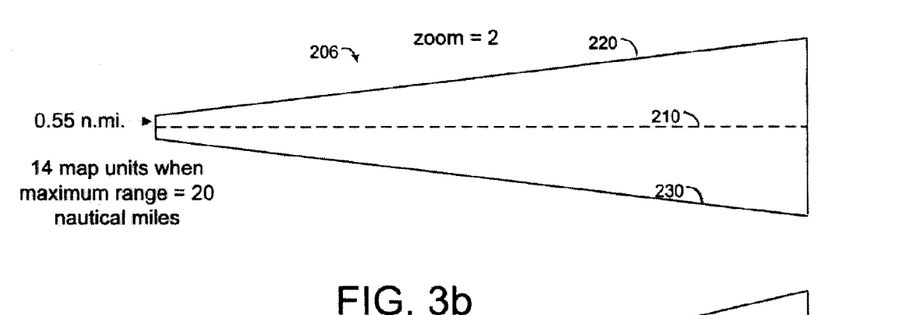
FIG. 3b is a vertical profile of a theoretical ground return as portrayed at a zoom factor of 2.
Figure 3C:
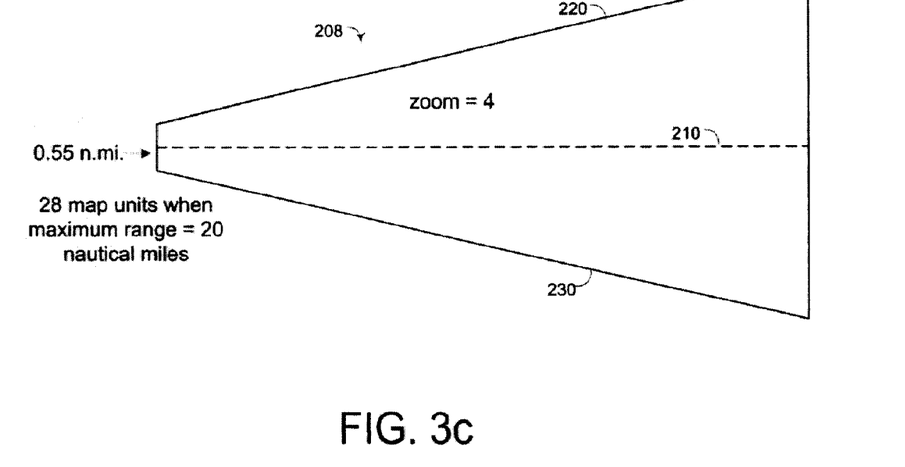
FIG. 3c is a vertical profile of a theoretical ground return as portrayed at a zoom factor of 4.

FIGS. 3a, 3b, and 3c, show vertical profiles of a theoretical ground return at zoom factors of 1, 2, and 4 respectively. The theoretical ground return profile is the trapezoid enclosing ground returns. In order to discuss the portrayal of ground returns as shown on a display, a theoretical display of 400 pixels high by 256 pixels long is discussed. Those skilled in the art will readily perceive that the theoretical display is provided as an example and does not limit the invention. The theoretical display allows the discussion of the arithmetic transforms used to scale the data as necessary to properly portray the return data on a display.

As discussed above, the characteristic shape of the pattern of ground returns is a trapezoid. Ground returns in this trapezoid on a display generally appear to the operator or other viewer as a cross-section of a flashlight-like beam across the vertical profile. As the radar beam is scanned over the ground, the solid returns characterized by a mirror image above and below the ground level providing reflectivity equal to the beam width and power level. As the altitude and range increase, the ground returns will decay in much the same way as they increased from where the beam first intersected the ground. In the theoretical display, the width of the trapezoid along the axis of symmetry is the same as the width of the display, i.e. 256 pixels.

FIG. 3a shows a display 204 of the 20 nautical mile radius range of theoretical radar. Using return data for a radar typical of vertical profile radar displays, the dimensions of the actual ground return of the theoretical ground return on the discussed display only vary in the vertical dimension. The range of the display is fixed by the width at 256 map units. The slope of the top 220 and bottom 230 of the trapezoid is not pronounced. At the zoom factor of 1, at the extreme end of the range, the height of the ground return trapezoid is 7 pixels above the central axis 210 and 7 pixels below the central axis 210.

FIG. 3b shows a display 206 of the same 20 nautical mile radius range of the theoretical radar. At a zoom factor of 2, the slope of the top 220 and the bottom 230 of the ground return trapezoid is more pronounced. At the extreme end of the range, the height of ground return trapezoid is 14, rather than 7 pixels above the central axis 210 and 14 pixels below the central axis 210.

FIG. 3c shows a display 208 of the same 20 nautical mile radius range of the theoretical radar. At a zoom factor of 4, the slope of the top 220 and the bottom 230 of the ground return trapezoid is still more pronounced. At the extreme end of the range, the ground return trapezoid is twice as great as at zoom factor 2. The height of the ground return trapezoid is 28 pixels above the central axis 210 and 28 pixels below the central axis.

Figure 4:
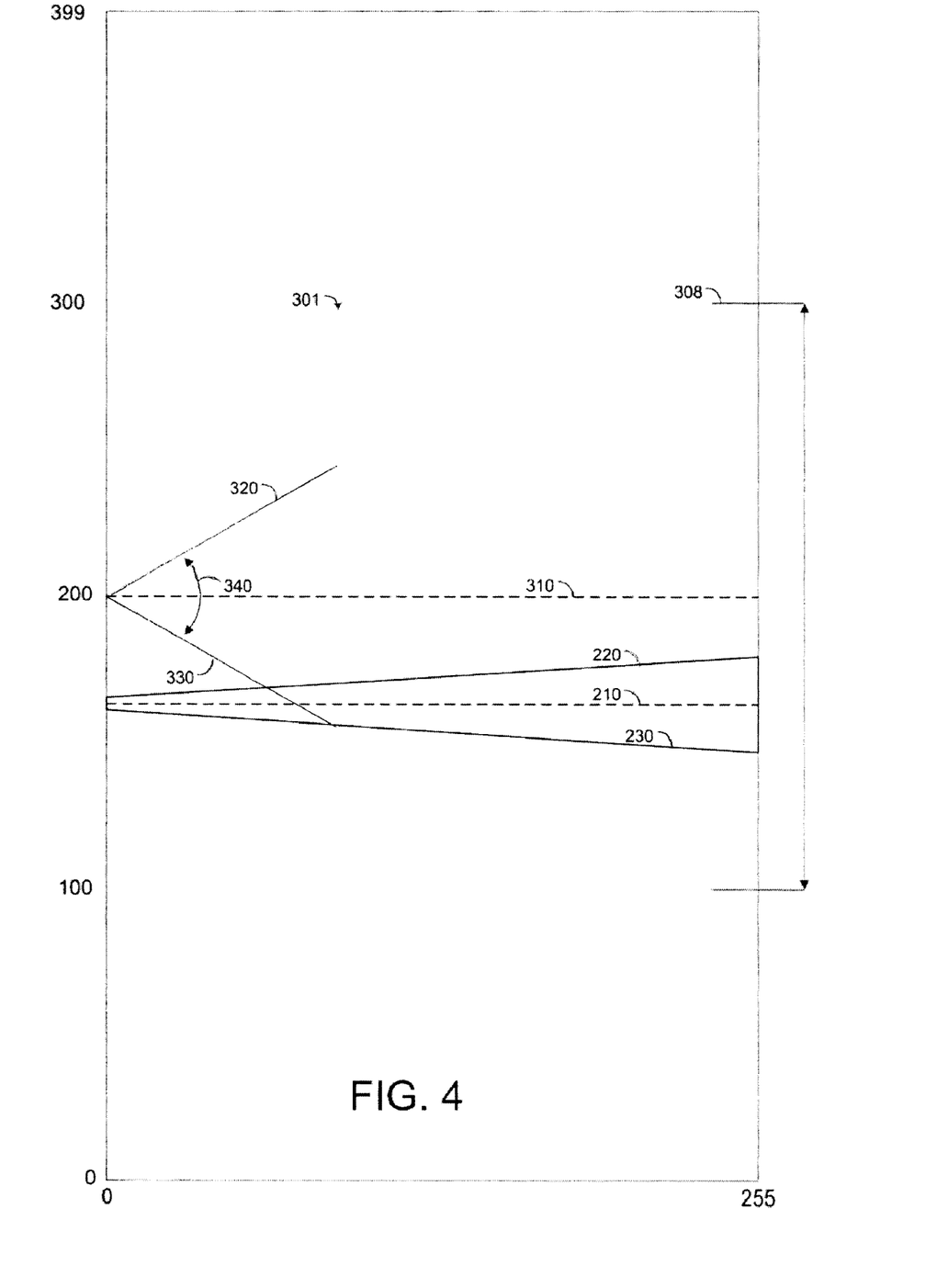
FIG. 4 is a display of a vertical profile including a theoretical ground return at a zoom factor of 1.

The study of the display of the ground return trapezoid becomes significant in the display of radar returns when the ground returns are at the central axis of the display. FIG. 4 is a display 301 of a vertical profile including a theoretical ground return at a zoom factor of 1. In the theoretical radar, the vertical scan moves from the upper extreme 320 to the lower extreme 330 to define a vertical sweep sector 340. The projected path of the aircraft 310 is the central axis of the vertical sweep sector as portrayed, though not necessarily so. As shown, the vertical sector sweeps from 30° above the projected path 310 and 30° below. Configurations allowing greater or lesser sweeps above and below the projected path 310. Nor is it necessary that the sweep be symmetric about the projected path 310.

The display 301 is egocentric to the aircraft meaning that as rendered, the aircraft remains in the center of the display. A projected path of the aircraft 310 based upon the altitude of the aircraft bisects the display. Also portrayed is an aircraft-centered buffer view section 308 that comprises the portion of display most relevant to the operator as it is closest to the projected path of the aircraft 310.

The portion of the display outside of the swept sector contains no return information and, therefore, will not inform the operator. Importantly, the ground return envelope shown between the top 220 and the bottom 230 of the trapezoid is not solely the product of return information but, rather, exists as an extrapolation as discussed above. Nonetheless, an operator may elect to display the trapezoid as it does give elevation information to operator thereby giving the operator a sense of scale as to relative elevation of portrayed targets 60 (FIG. 1).

Optionally, the operator can selectively remove any return information below the top 220 of ground return trapezoid entirely in order to prevent the confusion of ground returns allowing the operator to analyze the remainder of the displayed returns for patterns that might otherwise be hidden by the presence of the ground returns. Alternatively, the operator might selectively display the centerline 210 as a brown line symbolic of the terrain boundary.

Figure 5:
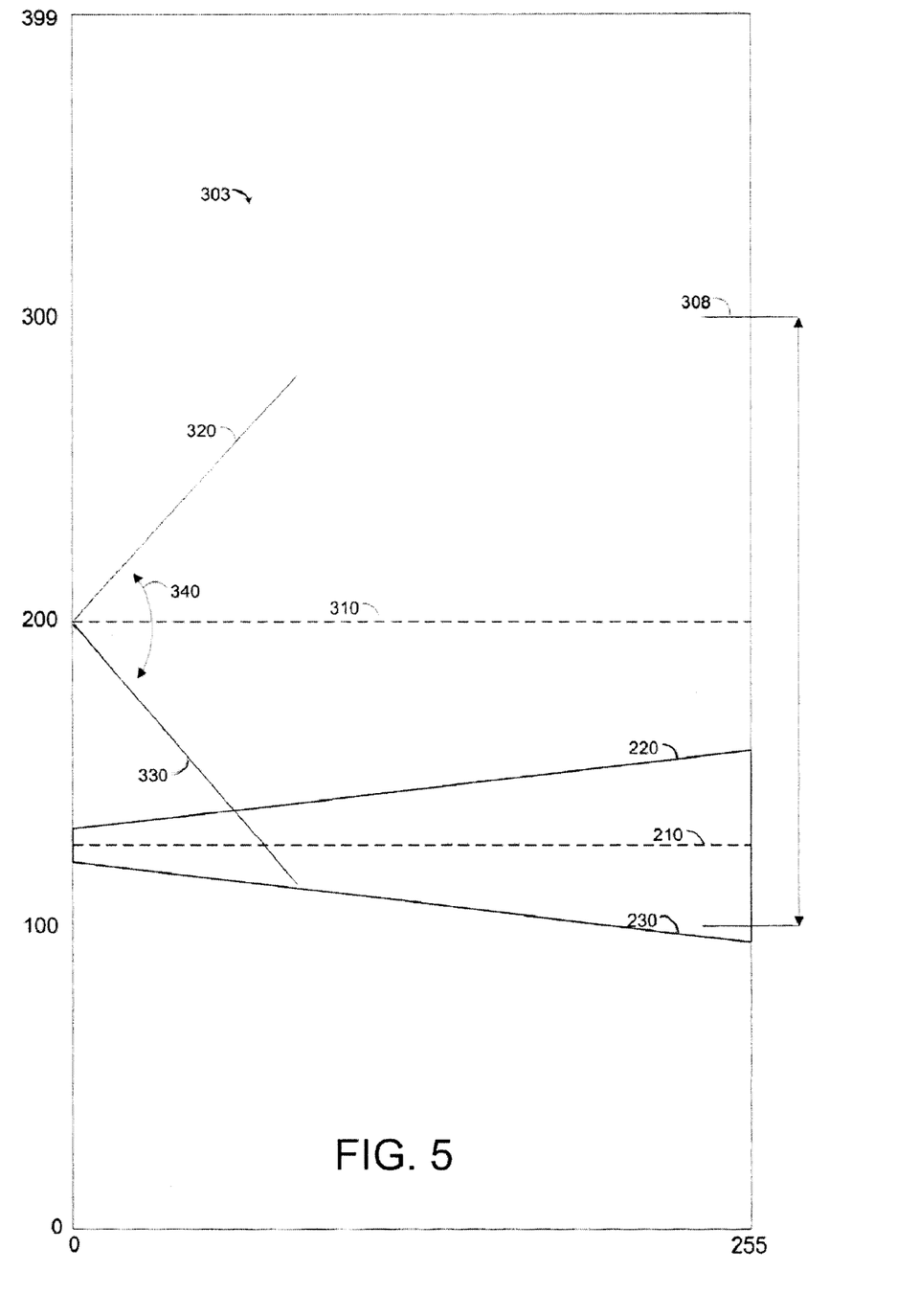
FIG. 5 is a display of a vertical profile including a theoretical ground return at a zoom factor of 2.

Referring then to FIG. 5 in contrast to FIG. 4, a vertical profile of a display 303 including a theoretical ground return at a zoom factor of 2, the projected path 310 remains at the center of the display 303. All of the remaining elements displayed in FIG. 4 have been shifted outward in FIG. 5 from the projected path 310. This shifting results in increase slopes of each of the boundaries of ground return envelope shown as the top 220 and the bottom 230 and the vertical scan boundaries from the upper extreme 320 to the lower extreme 330 used to define a vertical sweep sector 340. Because of the greater zoom factor, the ground return boundary 220 is pushed, upon zooming, closer to the bottom of the display 303.

Figure 6A:
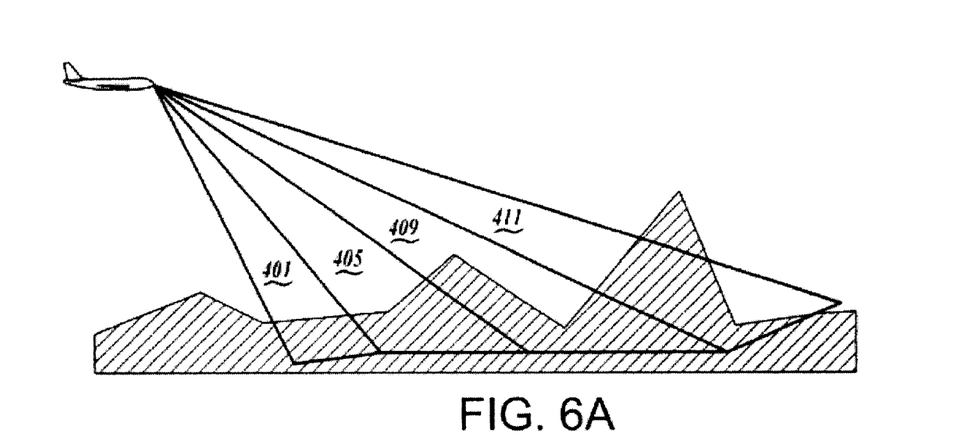
FIGS. 6a–c are diagrams showing the suppression of ground contaminated range bins.
Figure 6B:
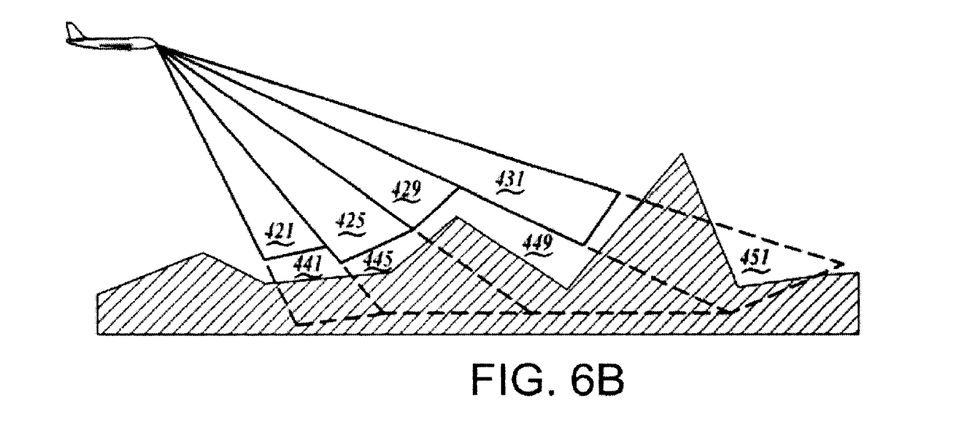
Figure 6C:
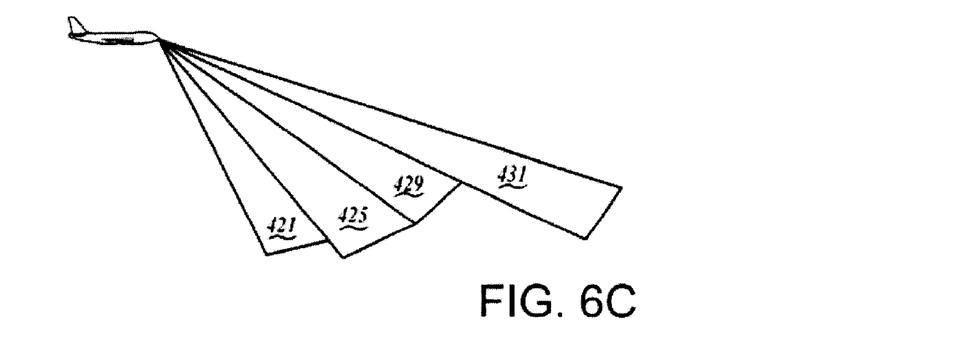

FIGS. 6A–C are diagrams showing the suppression of ground contaminated range bins. Each of the radio pulses are sent out at known angles. Thus, radians 401, 405, 409, and 411 represent the areas illuminated by a series of radio pulses. As discussed above, the terrain height is derived, in one preferred method, from the EGPWS database. Because the location of each range bin is easily derived from the EGPWS database, those range bins that contain terrain returns are removed from the information sent to the display. In the simplest examples, the radians 401 and 405 are divided according to the terrain level. Dividing the radian 401, results in a set of range bins without terrain contamination 421 and a set of terrain contaminated range bins 441. Similarly, the radian 425 is divided at the point of terrain most proximal to the aircraft, resulting in two sets of range bins, the set of range bins without terrain contamination 425, and the set of terrain contaminated range bins 445.

The radians 409 and 411 demonstrate the distinction between using the point of terrain along a radian most proximal to the aircraft, rather than the highest point of terrain. The point of terrain for dividing the radian 409 is that point closest to the aircraft, even though the whole of the radian is not occluded by terrain. The closest range bin to the aircraft that contains any point of terrain within the radian is used as the first range bin in the set of terrain contaminated range bins 449, for radian 409.

The radian 411 demonstrates the consistency of the discarding of ground contaminated range bins. As above, the first range bin with terrain is the first range bin in the set of ground contaminated range bins 451. According to this standard, those range bins in the shadow of the terrain though not themselves containing terrain are also marked as ground contaminated. Understanding that the radio pulse cannot penetrate the terrain to reach the range bins without terrain beyond the first terrain contaminated range bins.

When the display processor 42 (FIG. 1), suppresses the display of returns from sets of terrain contaminated range bins 441, 445, 449, and 451, it will only display returns from the sets of range bins without terrain contamination 421, 425, 429, 431. The returns from sets of range bins without terrain contamination 421, 425, 429, 431, are the only range bins that will contain usable information. Removing the set of terrain contaminated range bins 441, 445, 449, and 451 from consideration, enhances the operator's concentration on the remaining, valid, information.

As described, the display is configured to focus rather than to dissipate the attention of the operator. Additionally, the use of the zoom factor to expand the details of return information along the vertical axis allows the operator to study unsuppressed returns in detail without changing the displayed range. The invention serves to enhance the information reported to the operator.

While the preferred embodiment of the invention has been illustrated and described, as noted above, many changes can be made without departing from the spirit and scope of the invention. Accordingly, the scope of the invention is not limited by the disclosure of the preferred embodiment.

The embodiments of the invention in which an exclusive property or privilege is claimed are defined as follows:

1. A method for suppression of ground returns in a vertical profile radar display, the method comprising:

receiving radar returns each comprising a plurality of range bins collated to a vertical profile radar display;

analyzing received range bins to locate ground returns;

selecting a plurality of range bins based upon the located ground returns; and modifying the radar returns based upon the selected range bins.

2. The method of claim 1, wherein receiving radar returns includes receiving radar returns suitable for radio altimetry.

3. The method of claim 2, wherein the received radar returns suitable for radio altimetry are used to determine a terrain level.

4. The method of claim 3, wherein the analyzing received range bins includes constructing a ground return trapezoid with its axis of symmetry at the determined terrain level.

5. The method of claim 4, wherein the range bins being at least below an upper boundary of the constructed ground return trapezoid are marked as ground contaminated.

6. The method of claim 5, wherein modifying the radar returns includes suppressing the portion of the radar returns from the ranges bins marked as ground contaminated.

7. The method of claim 5, wherein modifying the radar returns includes coloring the portion of the radar returns from the range bins marked as ground contaminated.

8. The method of claim 5, wherein modifying the radar returns includes the addition of a displayed line at the determined terrain level.

9. The method of claim 1, wherein analyzing received range bins includes retrieving points of terrain in a proximity to a radar antenna from a terrain height data database.

10. The method of claim 9, wherein the range bins being at least more distant from the radar antenna than each of the retrieved points of terrain are marked as ground contaminated.

11. The method of claim 10, wherein modifying the radar returns includes suppressing the portion of the radar returns from the ranges bins marked as ground contaminated.

12. The method of claim 10, wherein modifying the radar returns includes coloring the portion of the radar returns from the range bins marked as ground contaminated.

13. The method of claim 10, wherein modifying the radar returns includes the addition of a displayed line at the determined terrain level.

14. A system for suppression of ground returns in a vertical profile radar display, the system comprising:

means for receiving radar returns each comprising a plurality of range bins collated to a vertical profile radar display;

means for analyzing received range bins to locate ground returns;

means for selecting a plurality of range bins based upon the located ground returns; and means for modifying the radar returns based upon the selected range bins.

15. The system of claim 14, wherein receiving radar returns includes means for receiving radar returns suitable for radio altimetry.

16. The system of claim 15, wherein the means for analyzing received range bins includes means to determine a terrain level.

17. The system of claim 16, wherein the means for analyzing received range bins includes means for constructing a ground return trapezoid with its axis of symmetry at the determined terrain level.

18. The system of claim 17, wherein the means for analyzing include means for marking as ground contaminated range bins being at lest below an upper boundary of the constructed ground return trapezoid.

19. The system of claim 17, wherein means for modifying the radar returns includes means for suppressing the portion of the radar returns from the ranges bins marked as ground contaminated.

20. The system of claim 17, wherein means for modifying the radar returns includes means for coloring the portion of the radar returns from the range bins marked as ground contaminated.

21. The system of claim 17, wherein means for modifying the radar returns includes means for the addition of a displayed line at the determined terrain level.

22. The system of claim 14, wherein means for analyzing received range bins includes means for retrieving points of terrain in a proximity to a radar antenna from a terrain height data database.

23. The system of claim 22, wherein the means for analyzing radar returns includes marking as ground contaminated range bins being at least more distant from the radar antenna than each of the retrieved points of terrain.

24. The system of claim 23, wherein means for modifying the radar returns includes means for suppressing the portion of the radar returns from the ranges bins marked as ground contaminated.

25. The system of claim 23, wherein means for modifying the radar returns includes coloring the portion of the radar returns from the range bins marked as ground contaminated.

26. The system of claim 23, wherein modifying the radar returns includes the addition of a displayed line at the determined terrain level.

27. A display processor system for suppression of ground returns in a vertical profile radar display, the system comprising:

a radar receiver configured to receive radar returns each comprising a plurality of range bins collated to a vertical profile radar display;

a display processor coupled to the radar receiver, the display processor comprising:

a first component for locating ground returns based on the received range bins;

a second component for selecting a plurality of range bins based upon the located ground returns; and a third component for modifying the radar returns based upon the selected range bins.

28. The display processor system of claim 27, wherein the receiver receives radar returns suitable for radio altimetry.

29. The display processor system of claim 28, wherein the display processor, determines a terrain level based upon received radar returns suitable for radio altimetry.

30. The display processor system of claim 29, wherein the display processor constructs a ground return trapezoid with its axis of symmetry at the determined terrain level.

31. The display processor system of claim 30, wherein the display processor marks as ground contaminated range bins being at least below an upper boundary of the constructed ground return trapezoid.

32. The display processor system of claim 31, wherein the display processor suppresses the portion of the radar returns from the ranges bins marked as ground contaminated.

33. The display processor system of claim 31, wherein the display processor colors the portion of the radar returns from the range bins marked as ground contaminated.

34. The display processor system of claim 31, wherein display processor adds a displayed line at the determined terrain level.

35. The display processor system of claim 27, wherein the displayed processor retrieves points of terrain in a proximity to a radar antenna from a terrain height data database.

36. The display processor system of claim 35, wherein the display processor marks as ground contaminated range bins being at least more distant from the radar antenna than each of the retrieved points of terrain.

37. The display processor system of claim 36, wherein the display processor suppresses the portion of the radar returns from the ranges bins marked as ground contaminated.

38. The display processor system of claim 36, wherein the display processor colors the portion of the radar returns from the range bins marked as ground contaminated.

39. The display processor system of claim 36, wherein the display processor adds a displayed line at the determined terrain level.

* * * * *